(12) United States Patent
Mailaender et al.

(10) Patent No.: US 7,200,631 B2
(45) Date of Patent: Apr. 3, 2007

(54) METHOD AND APPARATUS FOR DETERMINING AN INVERSE SQUARE ROOT OF A GIVEN POSITIVE-DEFINITE HERMITIAN MATRIX

(75) Inventors: Laurence Eugene Mailaender, New York, NY (US); Jack Salz, Fair Haven, NJ (US); Sivarama Krishnan Venkatesan, Secaucus, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 674 days.

(21) Appl. No.: 10/340,575

(22) Filed: Jan. 10, 2003

(65) Prior Publication Data

US 2004/0139137 A1    Jul. 15, 2004

(51) Int. Cl.
G06F 7/32     (2006.01)
G06F 7/38     (2006.01)
(52) U.S. Cl. ...................... 708/520; 708/605
(58) Field of Classification Search ........... 708/520, 708/607, 510, 605
See application file for complete search history.

(56) References Cited

U.S. PATENT DOCUMENTS 6,622,117 B2 * 9/2003 Deligne et al. ............. 702/190
6,675,106 B1 * 1/2004 Keenan et al. .............. 702/28
2002/0154716 A1 * 10/2002 Erving et al. ............... 375/348
2004/0114695 A1 * 6/2004 Astely et al. ............... 375/343

OTHER PUBLICATIONS

Press et al., "Numerical Recipes in C," Chapter 2 §2.9 Cholesky Decomposition (1988), pp. 96-98.

* cited by examiner

Primary Examiner—Chuong D. Ngo

(57) ABSTRACT

Generally, a method and apparatus are provided for computing a matrix inverse square root of a given positive-definite Hermitian matrix, K. The disclosed technique for computing an inverse square root of a matrix may be implemented, for example, by the noise whitener of a MIMO receiver. Conventional noise whitening algorithms whiten a non-white vector, X, by applying a matrix, Q, to X, such that the resulting vector, Y, equal to Q·X, is a white vector. Thus, the noise whitening algorithms attempt to identify a matrix, Q, that when multiplied by the non-white vector, will convert the vector to a white vector. The disclosed iterative algorithm determines the matrix, Q, given the covariance matrix, K. The disclosed matrix inverse square root determination process initially establishes an initial matrix, $Q_0$, by multiplying an identity matrix by a scalar value and then continues to iterate and compute another value of the matrix, $Q_{n+1}$, until a convergence threshold is satisfied. The disclosed iterative algorithm only requires multiplication and addition operations and allows incremental updates when the covariance matrix, K, changes.

18 Claims, 1 Drawing Sheet

METHOD AND APPARATUS FOR DETERMINING AN INVERSE SQUARE ROOT OF A GIVEN POSITIVE-DEFINITE HERMITIAN MATRIX

FIELD OF THE INVENTION

The present invention relates to signal processing techniques and, more particularly, to techniques for determining an inverse square root of a given positive-definite Hermitian matrix, K.

BACKGROUND OF THE INVENTION

A number of signal processing applications must find an inverse square root of a given positive-definite Hermitian matrix, K. For example, FIG. 1 is a schematic block diagram of an exemplary conventional multiple-input-multiple-output (MIMO) receiver system 100. A maximum likelihood detector 150 may be used for detecting signals sent via channels of this kind. Typically, when the MIMO channel is frequency-selective, a space-time equalizer 110 is used to pre-process the received signal to mitigate the spatial and temporal self-interference introduced by the channel. The space-time equalizer 110, however, spatially colors the Additive White Gaussian Noise (AWGN) at its input. Thus, the equalized signal is combined with colored noise. The non-white nature of this noise is known to impair the performance of the maximum likelihood detector 150.

Thus, a number of noise whiteners 130 have been proposed or suggested to perform "whitening" on the noise portion of the signal to remove the spatial correlation introduced by the space-time equalizer 110. Traditionally, noise whitening algorithms involve computing square roots and performing arithmetic division. The standard method for solving the inverse square root problem is based on Cholesky factorization. While algorithms based on Cholesky factorization work very well in software-based applications, they suffer from a number of limitations which make such algorithms unsuitable for a hardware implementation. Specifically, algorithms based on Cholesky factorization require scalar divisions and square roots which are computationally expensive operations to perform in hardware, due to their complexity.

A need therefore exists for a noise whitening algorithm that is suitable for a hardware implementation. A further need exists for an incremental noise whitening algorithm that only requires multiplication and addition operations. Yet another need exists for a method and apparatus for determining an inverse square root of a given positive-definite Hermitian matrix, K.

SUMMARY OF THE INVENTION

Generally, a method and apparatus are provided for computing a matrix inverse square root of a given positive-definite Hermitian matrix, K. The disclosed technique for computing an inverse square root of a matrix may be implemented, for example, by the noise whitener of a MIMO receiver. Conventional noise whitening algorithms whiten a non-white vector, X, by applying a matrix, Q, to X, such that the resulting vector, Y, equal to Q·X, is a white vector. Thus, the noise whitening algorithms attempt to identify a matrix, Q, that when multiplied by the non-white vector, will convert the vector to a white vector. This process generally involves the determination of an inverse square root of a given positive-definite Hermitian matrix, K.

The present invention provides a method and apparatus for determining an inverse square root of a given positive-definite Hermitian matrix, K. In particular, the iterative algorithm of the present invention determines the matrix, Q, given the covariance matrix, K. The present invention can be applied, for example, in the spatial noise whitener required in a MIMO receiver that employs a space-time equalizer, having an associated covariance matrix, K, and a maximum likelihood detector. The disclosed iterative algorithm compensates for the spatial noise coloring introduced by the space-time equalizer.

The disclosed matrix inverse square root determination process initially establishes the value of an initial matrix, $Q_0$, as follows:

$$Q_0 = aI$$

where I is the identity matrix. The matrix inverse square root determination process continues to iterate and compute another value of the matrix, $Q_{n+1}$, as follows $$Q_{n+1} = \frac{3}{2}Q_n - \frac{1}{2}K \cdot Q_n^3,$$

where K is the covariance matrix, until a convergence threshold is satisfied.

The disclosed iterative algorithm thus only requires multiplication and addition operations. In addition, the iterative algorithm of the present invention allows incremental updates when the covariance matrix, K, changes. Generally, the present invention provides an iterative routine that starts with an initial assumption for the matrix, $Q_0$, and converges to the final solution.

A more complete understanding of the present invention, as well as further features and advantages of the present invention, will be obtained by reference to the following detailed description and drawings.

DETAILED DESCRIPTION

Figure 1:
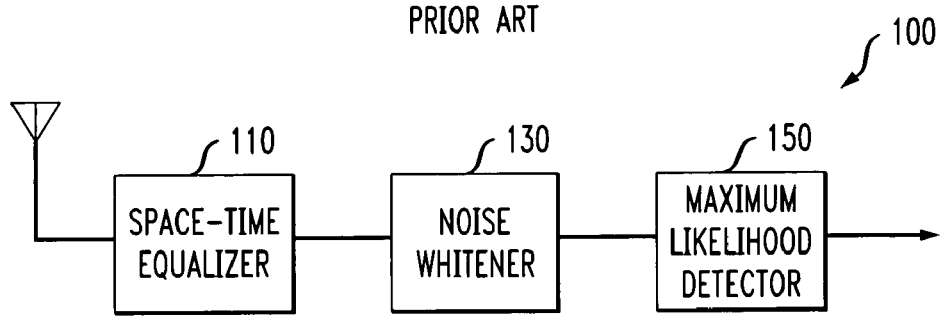
FIG. 1 is a schematic block diagram of an exemplary conventional multiple-input-multiple-output (MIMO) receiver system.

The present invention provides a method and apparatus for computing a matrix inverse square root of a given positive-definite Hermitian matrix, K. As discussed further below, a matrix inverse square root determination process 200, as discussed further below in conjunction with FIG. 2, incorporating features of the present invention may be implemented, for example, by the noise whitener of FIG. 1.

Vector Terminology

Consider a vector, X, comprised of random variables $X_1$ through $X_m$, as follows:

$$X = \begin{pmatrix} X_1 \\ X_2 \\ \ldots \\ X_m \end{pmatrix} \quad \text{Eq. (1)}$$

The covariance matrix, K, of the vector, X, may be expressed as follows:

$$E\{XX^H\}=K \quad \text{Eq. (2)}$$

where E is an expected value and $X^H$ is the conjugate transpose of X. The expression $XX^H$ may be evaluated as follows:

$$\begin{pmatrix} X_1 \\ X_2 \\ \ldots \\ X_m \end{pmatrix} \cdot (X_1^* \ldots X_m^*) \quad \text{Eq. (3)}$$

which is equivalent to:

$$\begin{pmatrix} X_1 X_1^* & X_1 X_2^* & \\ & \ldots & \\ & & \ldots \end{pmatrix}$$

If the random variables $X_1$ through $X_m$, are independent random variables, then each of the products that are not on the diagonal will be equal to zero. In other words, $$E\{X_i X_j^*\}=0 \text{ if } i \neq j \quad \text{Eq. (4)}$$

Therefore, when the random variables $X_1$ through $X_m$, are independent random variables, the covariance matrix, K, of the vector, X, may be expressed as follows:

$$K = \begin{pmatrix} E\{X_1 X_1^*\} & 0 & 0 \\ 0 & E\{X_2 X_2^*\} & 0 \\ 0 & 0 & E\{X_3 X_3^*\} \end{pmatrix} \quad \text{Eq. (5)}$$

When the random variables $X_1$ through $X_m$, are independent random variables in this manner, the vector, X, is said to be "white." The noise whitening algorithms discussed above attempt to force this structure represented by Equation 5. Generally, for a non-white vector, X, the individual random variables $X_1$ through $X_m$, are not all independent random variables.

The noise whitening algorithms discussed above whiten a non-white vector, X, by applying a matrix, Q, to X. Thus, the noise whitening algorithms attempt to identify a matrix, Q, that belongs to the set of all M×M matrices having complex entries, $$Q \in \mathcal{C}^{M \times M} \text{s.t}$$

such that Y=QX is a white vector. It follows that:

$$E\{YY^*\}=E\{(QX)(QX^*)\}$$

and $$E\{YY^*\}=QKQ^*.$$

Thus, given the covariance matrix, K, the matrix Q can be obtained, such that:

$$I=QKQ^* \quad \text{Eq. (6)}$$

where I is the identity matrix having each diagonal entry equal to one and all other entries equal to zero. The matrix, K, is a Hermitian matrix if:

$$K=K^*.$$

By definition, the covariance matrix, K, must be a Hermitian matrix since:

$$K=E\{XX^*\}$$

$$K^*=(E\{XX^*\})^*$$

$$K^*=E\{XX^*\}^*\}$$

$$K^*=E\{XX^*\}=K$$

The present invention provides a method and apparatus for determining an inverse square root of a given positive-definite Hermitian matrix, K. In particular, the iterative algorithm of the present invention determines the matrix, Q, given the covariance matrix, K, associated with the space-time equalizer 110 in the exemplary MIMO receiver embodiment. As discussed hereinafter, the iterative algorithm of the present invention only requires multiplication and addition operations. In addition, the iterative algorithm of the present invention allows incremental updates when the covariance matrix, K, changes. In other words, when the covariance matrix, K, changes, for example, due to a change in the channel, the present algorithm continues from the previous covariance matrix, K, and updates the results. Generally, the present invention provides an iterative routine that starts with an initial assumption for the matrix, $Q_0$, and converges to the final solution.

Iterative Noise Whitening Filter

The noise whitening filter 130 of the present invention uses an iterative process to determine the noise whitening matrix, which is then used to filter the vector of values being output from the space-time equalizer 110 in the exemplary MIMO receiver application. The present invention recognizes that computational efficiency can be achieved due to properties of the Hermitian matrices. More specifically, the data is manipulated in matrices that are the complex transpose of themselves. Given a matrix, $Q_n$, then the next value of the matrix, $Q_{n+1}$, can be expressed as follows:

$$Q_{n+1} = \frac{3}{2}Q_n - \frac{1}{2}K \cdot Q_n^3, \quad \text{Eq. (7)}$$

It is again noted that equation 7 includes only multiplication and addition operations. As previously indicated, the space-time equalizer 110 introduces a coloring of the noise. Since the space-time equalizer 110 is known, the introduced covariance, K, is also known. It is further noted that convergence to the unique positive-definite Hermitian matrix inverse square root of K is guaranteed, if the iterations start from an initial matrix, $Q_0$, that is a sufficiently small scalar multiple of the identity matrix, I:

$$Q_0 = aI.$$

More precisely, a should be a small positive number in the following range:

$$0 < a < tr(K)^{-1/2}.$$

Thus, the matrix, $Q_{n+1}$, can be obtained without actually calculating the inverse square root of the trace (i.e., the sum of the diagonal elements of the matrix) of the covariance matrix, K, e.g., by using a look-up table.

In applications that do not require perfect noise whitening, and only require a level of whitening that causes negligible performance degradation, such as less than 0.1 dB, the iterative approach of the present invention provides an effective mechanism for balancing the performance versus complexity tuning. This balancing is not possible with conventional approaches based on Cholesky factorization.

The noise whitening filter 130 must be continually updated, as the space-time equalizer 110 is updated to track changes in the channel. The conventional approaches based on Cholesky factorization requires that the noise whitening filter 130 be fully recomputed each time the channel changes. The noise whitening filter 130 of the present invention permits updates to proceed from the previously computed whitening filter, thus saving considerable additional computations.

Figure 2:
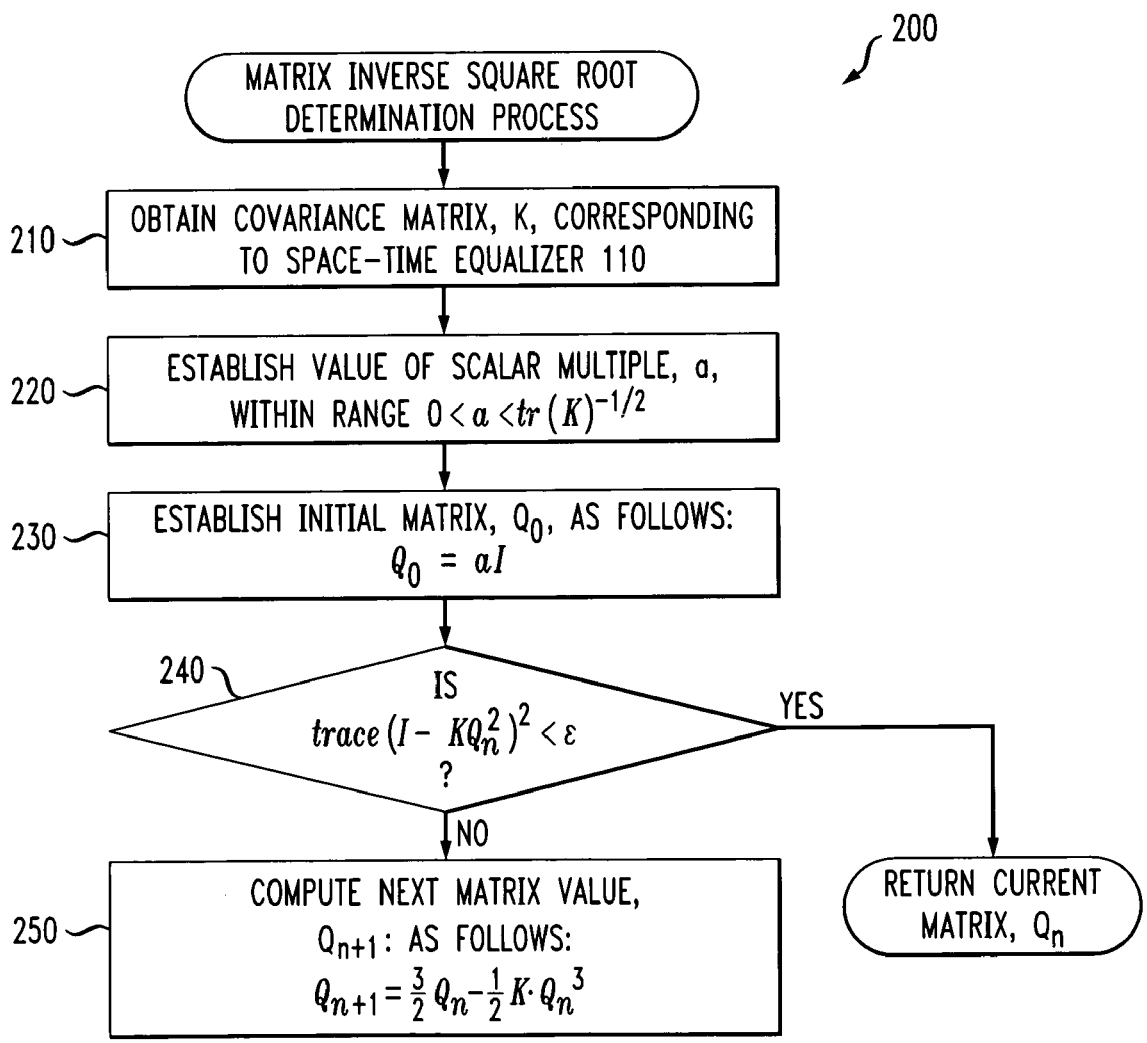
FIG. 2 is a flow chart of an exemplary matrix inverse square root determination process incorporating features of the present invention, that may be implemented, e.g., by the noise whitener of FIG. 1.

FIG. 2 is a flow chart of an exemplary implementation of the matrix inverse square root determination process 200 incorporating features of the present invention. As previously indicated, the matrix inverse square root determination process 200 may be implemented, e.g., by the noise whitener of FIG. 1. As shown in FIG. 2, the matrix inverse square root determination process 200 initially obtains the covariance matrix, K, corresponding to the space-time equalizer 110 during step 210.

Thereafter, the value of the scalar multiple, a, is established during step 220 within the following range:

$$0 < a < tr(K)^{-1/2}$$

and the initial matrix, $Q_0$, is established during step 230 as follows:

$$Q_0 = aI$$

A test is performed during step 240 to determine if the following expression is less than a predefined convergence threshold, $\epsilon$:

$$\text{trace}(I - KQ_n^2)^2,$$

where $\epsilon$ is a suitably chosen convergence threshold. If it is determined during step 240 that the expression is not less than the predefined convergence threshold, $\epsilon$, then the next matrix value, $Q_{n+1}$, is computed during step 250, as follows $$Q_{n+1} = \frac{3}{2} Q_n - \frac{1}{2} K \cdot Q_n^3,$$

and program control returns to step 240 to determine if the convergence threshold is satisfied, in the manner described above. Once it is determined during step 240 that the expression is less than the predefined convergence threshold, $\epsilon$, then the current matrix, $Q_n$, is returned.

The matrix inverse square root determination process 200 can be implemented, for example, in an application specific integrated circuit (ASIC) or a field programmable gate array (FPGA) or another programmable device, as would be apparent to a person of ordinary skill in the art.

It is to be understood that the embodiments and variations shown and described herein are merely illustrative of the principles of this invention and that various modifications may be implemented by those skilled in the art without departing from the scope and spirit of the invention.

We claim:

1. A method for determining an inverse square root of a covariance matrix, K, to convert a non-white input vector to a white vector said method comprising the steps of:

establishing an initial matrix, $Q_0$, in a memory by multiplying a scalar multiple, a, by an identity matrix, wherein said scalar multiple, a, is within a certain range; and computing a next value of the matrix, $Q_{n+1}$, until a convergence threshold is satisfied where:

$$Q_{n+1} = \frac{3}{2} Q_n - \frac{1}{2} K \cdot Q_n^3,$$

wherein K is a covariance matrix, and $Q_n$ is a value of said matrix, Q, after n iterations; and converting the non-white input vector to a white vector using said matrix, $Q_n$, once said convergence threshold is satisfied.

2. The method of claim 1, wherein said covariance matrix, K, corresponds to a space-time equalizer in a receiver.

3. The method of claim 1, wherein said range is expressed as:

$$0 < a < tr(K)^{-1/2}.$$

4. The method of claim 1, wherein said convergence threshold requires that the trace $(I - KQ_n^2)^2 < \epsilon$, where $\epsilon$ is a suitably chosen convergence value.

5. The method of claim 1, wherein once said convergence threshold is satisfied, said matrix, $Q_n$, when multiplied by a non-white input vector, will convert said input vector to a white vector.

6. A method for whitening an input vector, X, said method comprising the steps of:

establishing an initial matrix, $Q_0$, by multiplying said scalar multiple, a, by an identity matrix, wherein said scalar multiple, a, is within a certain range; and computing a next value of the matrix, $Q_{n+1}$, until a convergence threshold is satisfied where:

$$Q_{n+1} = \frac{3}{2} Q_n - \frac{1}{2} K \cdot Q_n^3,$$

wherein K is a covariance matrix, and $Q_n$ is a value of said matrix, Q, after n iterations; and multiplying said input vector, X, by said matrix, $Q_n$, once said convergence threshold is satisfied.

7. The method of claim 6, wherein said covariance matrix, K, corresponds to a space-time equalizer in a receiver.

8. The method of claim 6, wherein said range is expressed as:

$$0 < a < tr(K)^{-1/2}.$$

9. The method of claim 6, wherein said convergence threshold requires that the trace $(I-KQ_n^2)^2 < \epsilon$, where $\epsilon$ is a suitably chosen convergence value.

10. An apparatus for determining an inverse square root of a covariance matrix, K, to convert a non-white input vector to a white vector said apparatus comprising:
means for establishing an initial matrix, $Q_0$, in a memory by multiplying a scalar multiple, a, by an identity matrix, wherein said scalar multiple, a, is within a certain range; and
means for computing a next value of the matrix, $Q_{n+1}$, until a convergence threshold is satisfied where:

$$Q_{n+1} = \frac{3}{2}Q_n - \frac{1}{2}K \cdot Q_n^3,$$

wherein K is a covariance matrix, and $Q_n$ is a value of said matrix, Q, after n iterations; and
means for converting the non-white input vector to a white vector using said matrix, $Q_n$, once said convergence threshold is satisfied.

11. The apparatus of claim 10, wherein said covariance matrix, K, corresponds to a space-time equalizer in a receiver.

12. The apparatus of claim 10, wherein said range is expressed as:

$$0 < a < tr(K)^{-1/2}.$$

13. The apparatus of claim 10, wherein said convergence threshold requires that the trace $(I-KQ_n^2)^2 < \epsilon$, where E is a suitably chosen convergence value.

14. The apparatus of claim 10, wherein once said convergence threshold is satisfied, said matrix, $Q_n$, when multiplied by a non-white input vector, will convert said input vector to a white vector.

15. An apparatus for whitening an input vector, X, said apparatus comprising:
means for establishing an initial matrix, $Q_0$, in a memory by multiplying said scalar multiple, a, by an identity matrix, wherein said scalar multiple, a, is within a certain range; and
means for computing a next value of the matrix, $Q_{n+1}$, until a convergence threshold is satisfied where:

$$Q_{n+1} = \frac{3}{2}Q_n - \frac{1}{2}K \cdot Q_n^3,$$

wherein K is a covariance matrix, K, and $Q_n$ is a value of said matrix, Q, after n iterations; and
means for multiplying said input vector, X, by said matrix, $Q_n$, once said convergence threshold is satisfied.

16. The apparatus of claim 15, wherein said covariance matrix, K, corresponds to a space-time equalizer in a receiver.

17. The apparatus of claim 15, wherein said range is expressed as:

$$0 < a < tr(K)^{-1/2}.$$

18. The apparatus of claim 15, wherein said convergence threshold requires that the trace $(I-KQ_n^2)^2 < \epsilon$, where $\epsilon$ is a suitably chosen convergence value.

* * * * *